United States Patent
Fakhouri et al.

(10) Patent No.: US 11,269,613 B2
(45) Date of Patent: Mar. 8, 2022

(54) SOFTWARE PLATFORM UPGRADES

(71) Applicant: Pivotal Software, Inc., San Francisco, CA (US)

(72) Inventors: Onsi Joe Fakhouri, Denver, CO (US); Stev Witzel, Berlin (DE); Michael Schubert, New York, NY (US)

(73) Assignee: Pivotal Software, Inc., Palo Alto, CA (US)

(*) Notice: Subject to any disclaimer, the term of this patent is extended or adjusted under 35 U.S.C. 154(b) by 41 days.

(21) Appl. No.: 16/803,157

(22) Filed: Feb. 27, 2020

(65) Prior Publication Data

US 2020/0278857 A1   Sep. 3, 2020

Related U.S. Application Data

(60) Provisional application No. 62/811,824, filed on Feb. 28, 2019.

(51) Int. Cl.
| | | |
|---|---|---|
| *G06F 9/445* | (2018.01) | |
| *G06F 8/65* | (2018.01) | |
| *G06F 9/455* | (2018.01) | |
| *G06F 9/54* | (2006.01) | |

(52) U.S. Cl.
CPC ............ *G06F 8/65* (2013.01); *G06F 9/45558* (2013.01); *G06F 9/54* (2013.01); *G06F 2009/45562* (2013.01); *G06F 2009/45595* (2013.01)

(58) Field of Classification Search
CPC .......... G06F 8/65; G06F 9/45558; G06F 9/54; G06F 2009/45562; G06F 2009/45595

USPC ........................................................ 717/168
See application file for complete search history.

(56) References Cited

U.S. PATENT DOCUMENTS

2015/0264122 A1   9/2015  Shau
2018/0159721 A1*  6/2018  Delcheva ............... H04L 67/34

OTHER PUBLICATIONS

U.S. Appl. No. 16/207,689, filed Dec. 3, 2018, Colin Michael Humphreys.
U.S. Appl. No. 16/226,247, filed Dec. 19, 2018, Onsi Joe Fakhouri.

* cited by examiner

*Primary Examiner* — Chuck O Kendall
(74) *Attorney, Agent, or Firm* — Fish & Richardson P.C.

(57) ABSTRACT

Methods, systems, and apparatus, including computer programs encoded on computer storage media, for upgrading a software platform. One of the methods includes receiving, by a platform orchestrator, a request to upgrade computing resources of a software platform launched by the platform orchestrator, wherein a workload having multiple different software tasks is executing on multiple nodes of the software platform launched by the platform orchestrator; obtaining, by the platform orchestrator, a workload specification that specifies an upgrade ordering among multiple groups of the multiple software tasks executing on the software platform; and upgrading, by the platform orchestrator, all platform nodes that execute one or more software tasks in a first group of the multiple groups of software tasks before upgrading platform nodes that execute one or more software tasks in a second group of the multiple groups of software tasks, according to the upgrade ordering specified in the workload specification.

20 Claims, 5 Drawing Sheets

SOFTWARE PLATFORM UPGRADES

CROSS REFERENCE TO RELATED APPLICATIONS

This application claims priority to U.S. Provisional Application No. 62/811,824, filed on Feb. 28, 2019. The disclosure of the prior application is considered part of and is incorporated by reference in the disclosure of this application.

BACKGROUND

This specification generally relates to cloud computing software platforms.

A cloud software platform is a platform-as-a-service ("PaaS") cloud computing system that allows users to deploy and manage multiple instances of software workloads. In this specification, a workload refers generally to one or more software tasks to be executed by a software application platform. Each task can be implemented by a package, a utility, or an executable, to name just a few examples. The tasks of a workload commonly include both components that are in active development by the entity that deploys the workload as well as off-the-shelf software components. The software workloads are then executed by hardware of an underlying cloud computing infrastructure, which may or may not be maintained by a different entity, e.g., an entity providing an infrastructure-as-a-service ("IaaS") platform. A cloud software platform thus functions as a software layer between the cloud computing infrastructure and the workloads executing on the infrastructure.

One simple example of a workload that can be deployed on a cloud software platform is an online movie database. One software task can implement the front-end user interface, and another task can execute an off-the-shelf database package that implements backend database functionality. Additionally, another software task of the workload can execute a third-party application that tracks usage statistics of the online movie database by end users who access the database over the Internet.

One of the over-arching goals of cloud software platforms is self-service, which refers to a number of related functionalities that allow a developer or a platform administrator to launch workloads without cumbersome configuration and without intervention or approval by another person or entity. To that end, a cloud software platform can provision resources in the underlying cloud computing infrastructure as well as stage, launch, and configure workloads using the provisioned resources. Therefore, developers who use the cloud software platform need not spend time acquiring, building, or configuring the hardware of the underlying cloud computing infrastructure. Rather, the developers can focus on development and integration of software tasks of the workloads themselves, and the developers can rely on the services provided by the cloud software platform to launch and manage instances of the workloads.

A cloud software platform generally has multiple components that implement the software layer on top of the cloud computing infrastructure. These components generally include multiple platform nodes that are implemented by respective virtual machines, containers, or both. The workloads running on the software platform are then executed using the multiple platform nodes.

Deploying the software components that implement a software platform can be performed by a software system known as a platform orchestrator. In this specification, a platform orchestrator is a software system that provisions resources for and configures the components of a software platform, which for brevity may be referred to as the platform orchestrator launching the software platform. One example of a platform orchestrator is Pivotal Container Service (PKS). PKS provides developers with an interface that allows them to set up and configure a Kubernetes cluster, which is an example of a cloud software platform. A Kubernetes cluster is a container orchestrator that manages the execution of workloads in containers. Each software task in a Kubernetes cluster can be referred to as a pod, and each pod can have one or more containers that each execute the task. A Kubernetes cluster generally includes a master node and one or more worker nodes that can execute workloads in containers and ensure that the workloads continue stateful execution even in the presence of software or hardware failures. Thus, a developer can issue a handful of command-line commands to PKS, and PKS can provide the functionality of automatically provisioning resources for and configuring the nodes of a Kubernetes cluster that executes on the underlying cloud computing platform.

FIG. 1 is diagram that illustrates an example prior art system 100 for launching workloads on a software platform.

The system 100 includes a cloud environment 110, which includes a set of hardware resources 120 and a platform orchestrator 130. The hardware resources 120 include N servers 122a-n. The hardware resources 120 are typically hosted within a data center, which can be a distributed computing system having hundreds or thousands of computers in one or more locations.

The platform orchestrator 130 can launch multiple different software platforms, all according to a different specification, on the hardware resources 120. Here, the platform orchestrator has launched M software platforms 140a-m on the hardware resources 120. After launching a software platform, the platform orchestrator 130 can orchestrate the creation and deletion of virtual machines and containers within the software platforms, as needed. The platform orchestrator 130 can further be responsible for maintaining and updating the software platform.

After the platform orchestrator 130 has launched a software platform, e.g. the software platform 140a, then a user can launch a workload that includes one or more tasks 112 on the software platform 140a. A user device 102 can provide the tasks 112 to the platform orchestrator 130. For example, a user can provide the workload over a CLI or a GUI of the user device 102.

The tasks 112 of the workload are to be executed by the software platform 140a. The platform orchestrator can deploy the tasks 112 to be executed on respective platform nodes. For example the software platform 140a can include P nodes 150a-p. Each platform node 150a-p can execute one or more of the tasks 112. For example, the platform node 150a can execute one or more tasks 112a of the tasks 112, and the platform node 150p can execute one or more tasks 112p of the tasks 112. Each platform node can be implemented by a virtual machine, a container, or both.

Platform orchestrators help effectuate the self-service goals of cloud software platforms in a number of different use cases. For example an organization can install a platform orchestrator. Thereafter, development teams within the organization can use the platform orchestrator to launch their own independently operating software platforms. The development teams can then develop and launch workloads on those respective software platforms. The platform orchestrator thus removes the need for a centralized team to set up and configure multiple different software platforms within the organization.

However, the nature of platform orchestrators launching software platforms introduces an upgrade problem. In particular, users need to be able to upgrade the computing resources of the software platform launched by the platform orchestrator, preferably with minimal disruption to the executing workloads. In this specification, upgrading a software platform means modifying the software of a virtual machine or a container that implements a node of the platform. Thus, upgrading a software platform can include upgrading the virtual machines or containers that implement the software platform.

SUMMARY

This specification generally describes how a system can update the computing resources of a software platform while reducing or eliminating the disruption for the workloads executing on the platform. The computing resources can include, e.g., one or more virtual machines (VMs) and/or one or more containers. Generally, the upgrade can be rolled out by a platform orchestrator of the software platform.

In a first example implementation, the platform orchestrator can be provided some visibility into the topologies of the workloads being executed on the software platform. In this specification, a topology of a workload is a set of relationships between the different tasks of the workload, e.g., a hierarchy between master and child tasks and/or a defined data flow between the different tasks of the workload. In prior art systems, platform orchestrators are generally blind to the particular topologies of workloads that are launched on the software platform. By obtaining information about the topologies of the workloads, a platform orchestrator can ensure that the software platform is upgraded with reduced disruption to the executing workloads.

In a second example implementation, the workloads can be provided some visibility into the mechanisms of the platform orchestrator. In prior art systems, workloads generally have no interaction with a platform orchestrator that launches the software platform upon which the workloads execute. By providing workloads with an interface into the platform orchestrator, the software platform can be upgraded with reduced disruption to the executing workloads.

Particular embodiments of the subject matter described in this specification can be implemented so as to realize one or more of the following advantages.

In some existing techniques, a system upgrades a software platform by launching an entirely separate software platform that has the requested updates. Then, all the traffic of the original software platform is migrated to the new software platform. After each workload has been restarted on the new software platform, the original software platform is terminated. This migration can cause severe workload disruptions. Furthermore, the cost, both in terms of time and in terms of computational resources, of moving all of the data of the platform to the new version can be untenable.

Using techniques described in this specification, a software platform can be upgraded in-place. That is, a system can roll out the upgrades to the computing resources of the software platform that has already been launched, without needing to launch a new software platform and terminate the original one. When launching a stateful application on the software platform, an in-place upgrade is often preferred, because the cost of moving all the data from the original software platform to the new software platform can be prohibitive.

Some other existing systems can execute in-place upgrades, but do so without information about the topology of tasks being executed on the nodes of the software platform, which can be highly disruptive for many kinds of workloads. For example, some distributed database systems have two basic types of database nodes: 1) master database nodes that coordinate query planning and 2) segment database nodes that execute query plans received from the master database node. Rolling a platform update on a platform node that runs a segment database node before all master nodes have been rolled to the new version is highly risky. In particular, if the upgrade process fails, the database system may detect an unusual state and execute a disaster recovery process that causes lengthy workload disruptions and corresponding service outages.

Using techniques described in this specification, a software platform can be upgraded in-place using information about the topology of the nodes of the platform, allowing a platform orchestrator to safely roll out the upgrade without disrupting the workloads being run on the platform.

Further, by providing workloads with some visibility into the upgrade mechanisms of the platform orchestrator, some systems described in this specification allow the platform orchestrator to upgrade a software platform with reduced disruption to executing workloads. These techniques also mitigate the likelihood that the workloads will perform fault-recovery or disaster recovery procedures due to what should be considered routine upgrades to the underlying software platform.

BRIEF DESCRIPTION OF THE DRAWINGS

Like reference numbers and designations in the various drawings indicate like elements.

DETAILED DESCRIPTION

This specification describes techniques for a platform orchestrator to upgrade a software platform while executing workloads.

Figure 1:
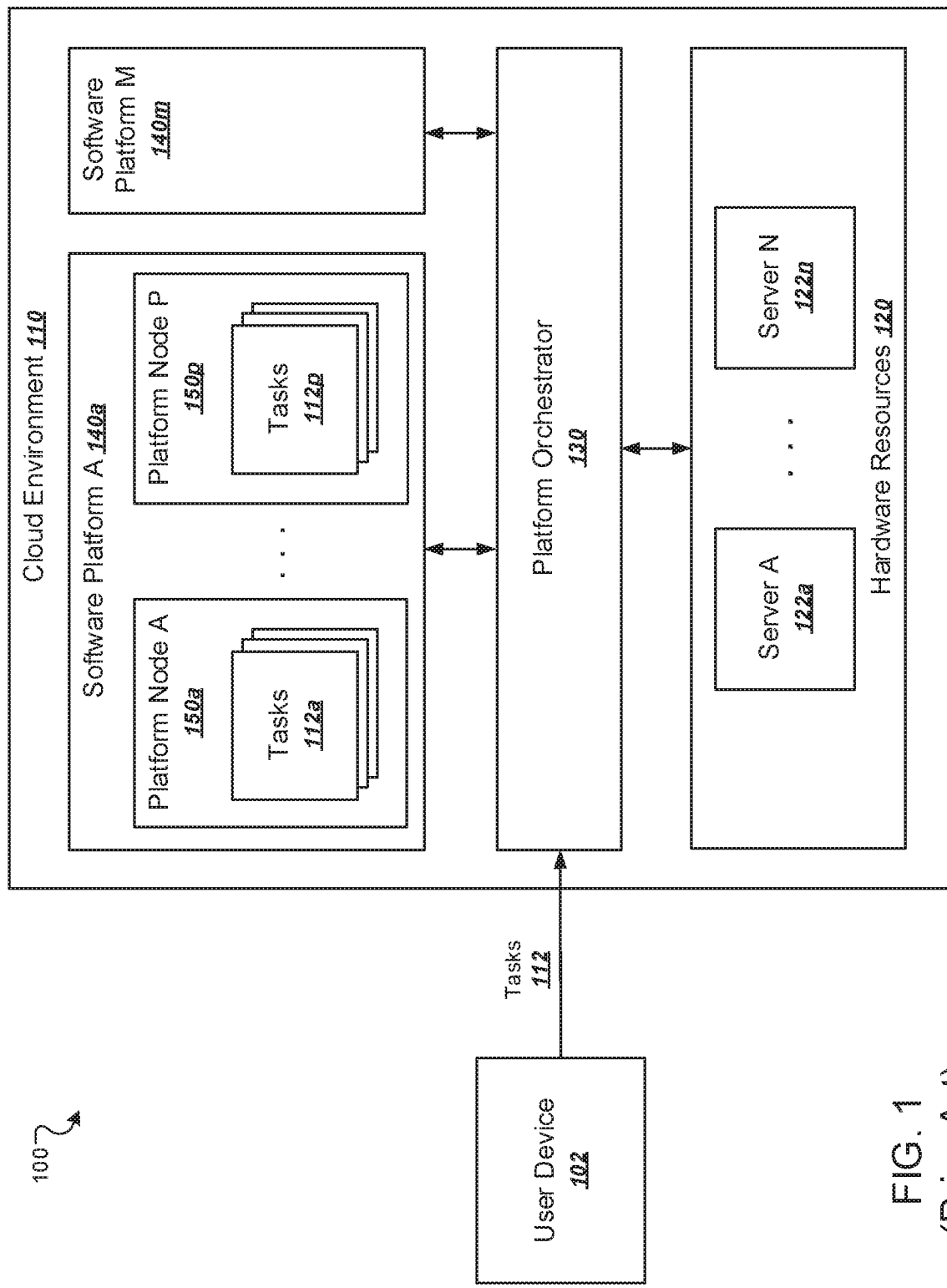
FIG. 1 is a diagram that illustrates an example prior art system for launching workloads on a software platform.
Figure 2:
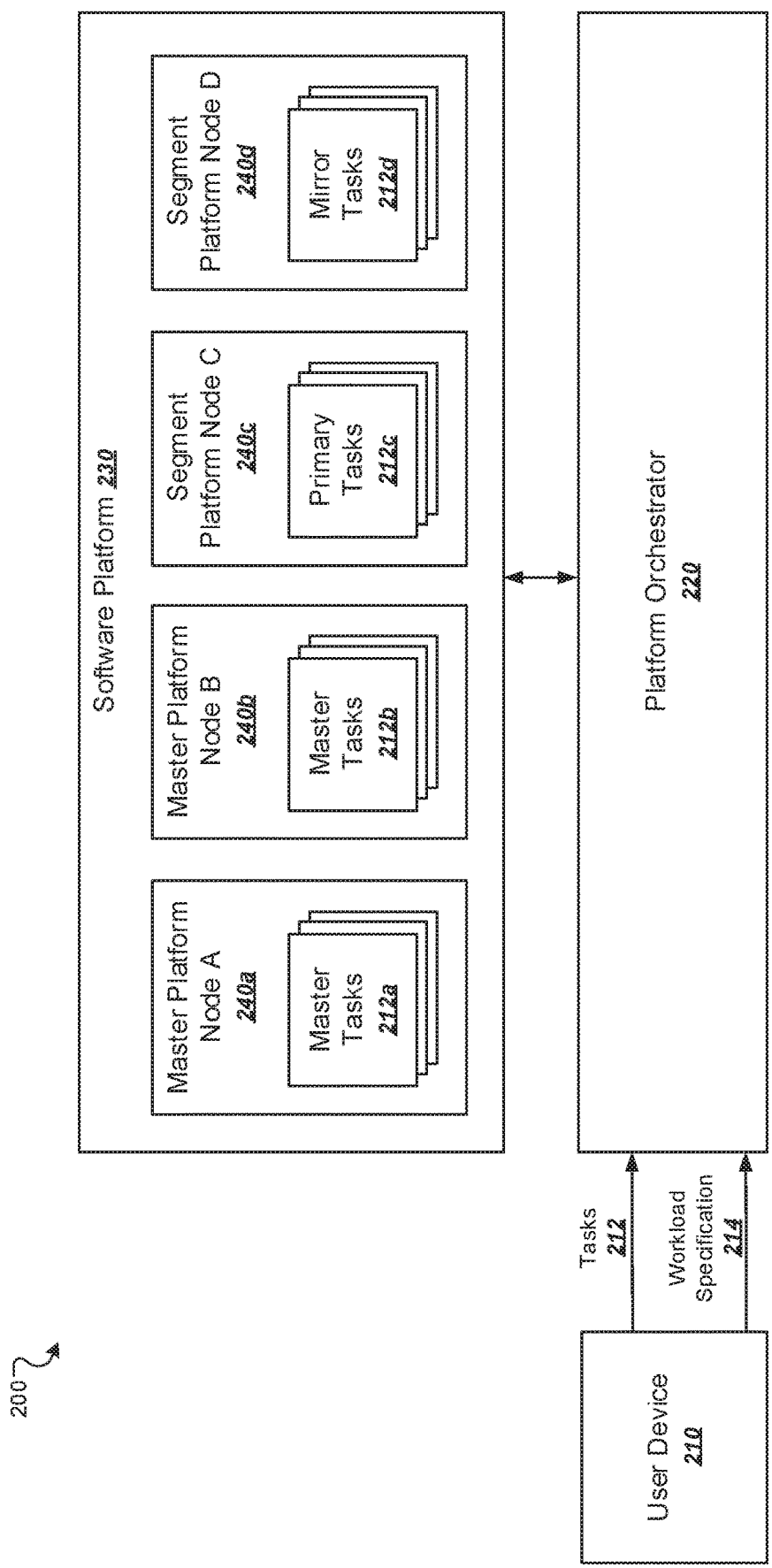
FIG. 2 is a diagram that illustrates an example system for updating a software platform.

FIG. 2 is a diagram that illustrates an example system 200 for updating a software platform. The system 200 uses information about the topology of workloads being executed on a software platform to update the software platform. The system 200 is an example of a system that can implement the techniques described in this specification.

The system 200 includes a platform orchestrator 220 and a software platform 230 previously launched by the platform orchestrator 220. A user device 210 can provide, to the platform orchestrator 220, a workload that includes multiple tasks 212 that are to be executed on the software platform 230.

The user device 210 also provides a workload specification 214 that specifies a workload-specified ordering in which the platform orchestrator should upgrade the computing resources of the software platform. In particular, the workload specification 214 identifies different groups of one or more tasks, and specifies that the computing resources executing some particular groups of tasks should be upgraded before the computing resources executing other particular groups of tasks when upgrading the computing resources of the software platform 230.

Using the workload specification 214, the platform orchestrator 220 can determine how to deploy the tasks 212 onto the nodes of the software platform 230. In particular, the platform orchestrator 220 can ensure that tasks from a first group of tasks and tasks in a second group of tasks are not deployed onto the same node of the software platform if the workload specification 214 dictates that the computing resources executing the first group of tasks should be updated before the computing resources executing the second group of tasks.

Thus, the developers of the workload, who know the particular interaction between different tasks of the workload, can control the ordering in which the groups of tasks have their underlying platform computing resources upgraded by the platform orchestrator.

For certain classes of workloads, e.g. certain workloads of stateful applications, observing a particular ordering of tasks during deployment of tasks on particular nodes and during updates of the software platform 230 is crucial to ensuring that certain lifecycle requirements of the workload are not violated.

As one example, consider Greenplum Database (GPDB), which is an example of a workload that can run on a software platform, e.g., a Kubernetes cluster launched by PKS. GPDB utilizes a common distributed systems pattern having a set of master nodes and a separate set of segment nodes. Generally, the master nodes issue query instructions to the segment nodes. During upgrades of GPDB, the platform orchestrator 220 should first upgrade the master nodes, validate that the upgrade was successful, and then upgrade the segment nodes. Segment nodes are further divided into primary nodes and mirror nodes. Each mirror node can serve as a backup to a particular primary node; in the event that the primary node becomes unavailable, the master nodes can issue query commands to the corresponding mirror node. Thus, the primary nodes should not be upgraded concurrently with the mirror nodes, in case the upgrade fails and both sets of nodes are unavailable. That is, either the primary nodes should be upgraded before the mirror nodes, or vice versa. Then, in the event of an upgrade failure, the data can be recovered quickly without forcing a disaster recovery from backup, which can cause lengthy service outages.

Therefore, the workload specification 214 identifies three groups of tasks: master tasks, primary tasks, and mirror tasks. The platform orchestrator 220 then deploys the tasks onto respective nodes using the specification. In particular, the platform orchestrator deploys one or more master tasks 212a of the tasks 212 to the master platform node 240a, one or more master tasks 212b of the tasks 212 to the master platform node 240b, one or more primary tasks 212c of the tasks 212 to the segment platform node 240c, and one or more mirror tasks 212d of the tasks 212 to the segment platform node 240d.

Then, when updating the software platform 230, the platform orchestrator 220 can roll out the upgrade to the master platform nodes 240a and 240b first. Then, after verifying that the upgrade to the master platform nodes 240a and 240b was successful, the platform orchestrator 220 can roll out the upgrade to the segment platform nodes 240c and 240d in either order, as long as the platform orchestrator 220 ensures that the upgrade to the first segment platform node was successful before starting the upgrade to the second segment platform node.

Figure 3:
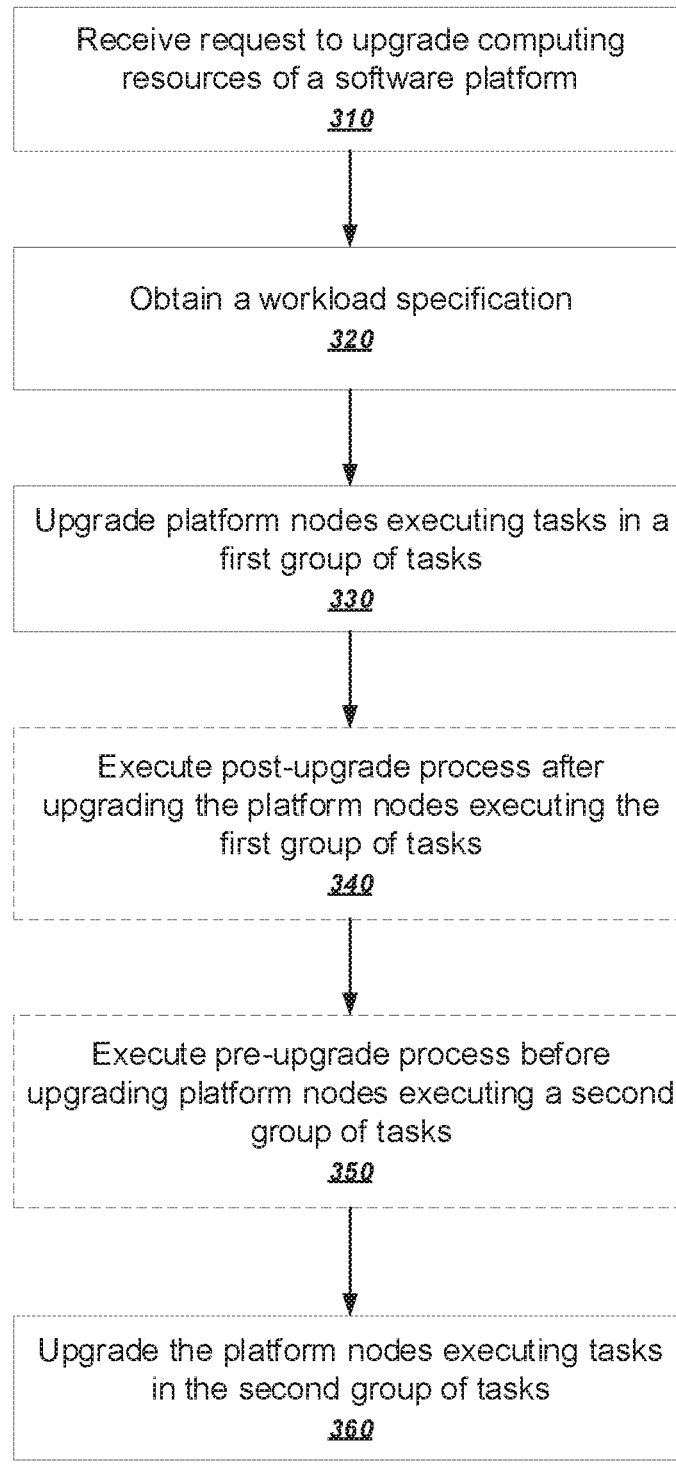
FIG. 3 is a flowchart of an example process for updating a software platform.

FIG. 3 is a flowchart of an example process 300 for updating a software platform. The process 300 can be implemented by one or more computer programs installed on one or more computers and programmed in accordance with this specification. For example, the process 300 can be performed by the platform orchestrator 220 depicted in FIG. 2. For convenience, the process will be described as being performed by a system of one or more computers.

The system receives a request to upgrade the computing resources of a software platform (step 310). The software platform has been launched by a platform orchestrator, and a workload having multiple different software tasks is executing on multiple nodes of the software platform launched by the platform orchestrator.

The system obtains a workload specification (step 320). The workload specification specifies an upgrade ordering among multiple groups of the software tasks executing on the software platform.

The software platform can launch the software tasks according to the groups of software tasks specified in the workload specifications such that software tasks in different groups do not execute on the same platform node. For example, the system can use special directives referred to as node taints to prevent the software platform from intermingling tasks in the different groups on the same nodes.

The system upgrades platform nodes executing tasks in a first group of software tasks (step 330). Upgrading a platform node can include installing an upgrade to a virtual machine or a container of the software platform. The system selects the first group of software tasks according to the upgrade ordering specified in the workload specification.

Optionally, the system executes a post-upgrade process after upgrading the platform nodes executing the first group of software tasks (step 340). For example, the system can perform a workload-specific verification process to verify that the platform nodes executing software tasks in the first group of software tasks were successfully upgraded. The post-upgrade process can be specified in the workload specification.

Optionally, the system executes a pre-upgrade process before upgrading platform nodes executing a second group of software tasks (step 350). For example, the system can perform a workload-specific process that provides one or more notifications to software tasks executing in the first group. As a particular example, if the first group of tasks is a group of master tasks and the second group of tasks is a group of segment tasks, where the master tasks issue instructions to the segments tasks as described above in reference to FIG. 2, then the system can inform the master tasks that the segment tasks will be evicting and should not be replicated during the upgrade process. The post-upgrade process can be specified in the workload specification.

The system upgrades the platform nodes executing tasks in the second group of software tasks (step 360).

Figure 4:
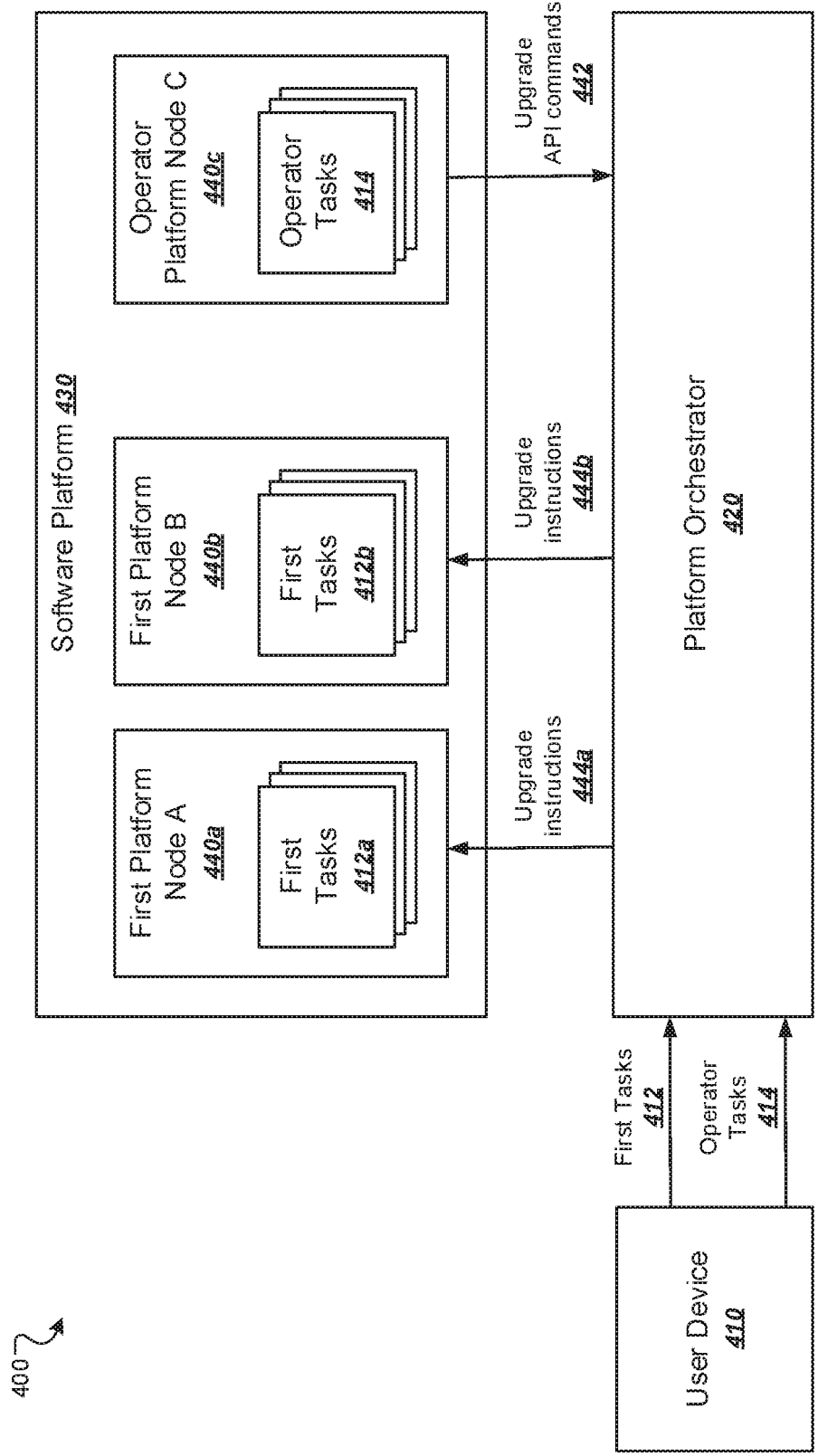
FIG. 4 is a diagram that illustrates another example system for updating a software platform.

FIG. 4 is a diagram that illustrates another example system 400 for updating a software platform. The system 200 provides workloads executing on a software platform with an interface into a platform orchestrator of the software platform to update the software platform. The system 400 is an example of a system that can implement the techniques described in this specification.

As before, the system 400 includes a platform orchestrator 420 and a software platform 430 previously launched by the platform orchestrator 420. A user device 410 can provide, to the platform orchestrator 420, a first workload of first tasks 412 that are to be executed on the software platform 430.

The user device 410 can also provide a special operator workload of operator tasks 414 to the platform orchestrator. The operator tasks 414 can include custom orchestration code to be executed on an operator node of the software platform 430 to perform lifecycle operations for the computing resources of the software platform 430. In particular, the platform orchestrator 420 can provide access to platform orchestrator application programming interfaces (APIs). The custom orchestration code can call these platform orchestrator APIs to perform the lifecycle operations, including rolling out updates to the computing resources of the software platform 430.

Thus, rather than a developer instructing the platform orchestrator 420 to upgrade the underlying software platform 430, the developer can include instructions in the operator tasks 414 to perform a platform upgrade. The executing operator tasks 414 can then call into the platform orchestrator APIs to orchestrate a complex upgrade of the underlying software platform 430. This approach provides a flexible mechanism for workloads to solve their own lifecycle problems, and represents a sort of inversion of control between the platform orchestrator 420 and the nodes of the software platform 430 itself.

Thus, upon receiving the first tasks 412 and the operator tasks 414, the platform orchestrator 420 can deploy the respective tasks on the software platform 430. In particular, the platform orchestrator 420 can deploy one or more first tasks 412a of the first tasks 412 on the first platform node 440a, and one or more first tasks 412b of the first tasks 412 on the first platform node 440b. The platform orchestrator 420 can also deploy the operator tasks 414 on the operator platform node 440c.

When the operator platform node 440 determines that software platform 430 should be updated, the operator platform node 440c can issue upgrade commands 442 using the API provided by the platform orchestrator 420. Upon receiving these upgrade API commands 442, which detail precisely how the platform orchestrator 420 should roll out the upgrade, the platform orchestrator 420 can roll out the upgrade by sending upgrade instructions 444a to the first platform node 440a and upgrade instructions 444b to the first platform node 440b. Each respective platform node then executes the upgrade using the respective upgrade instructions.

Figure 5:
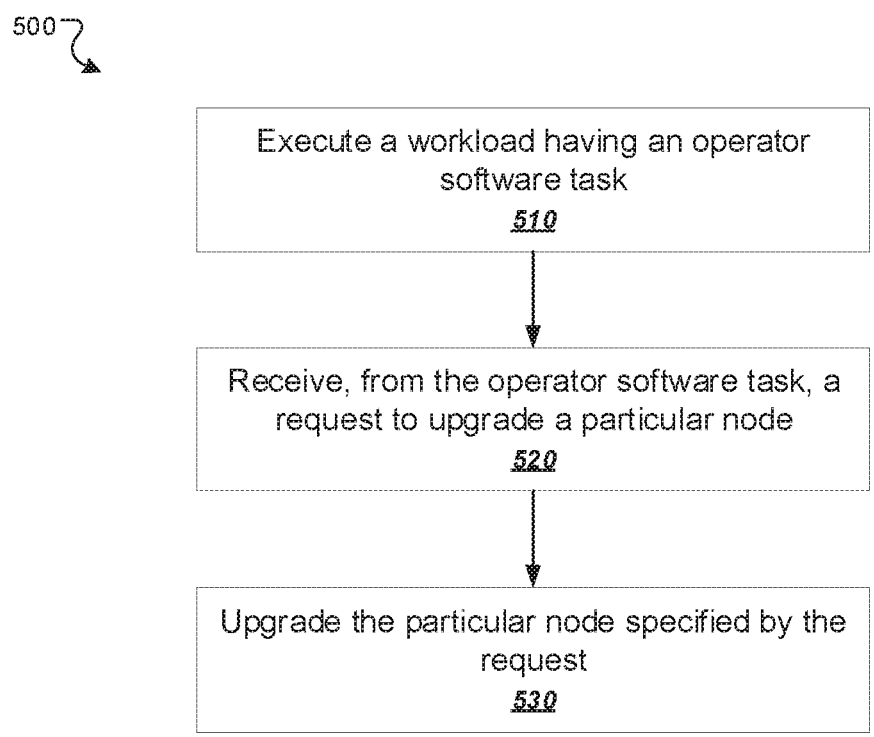
FIG. 5 is a flowchart of another example process for updating a software platform.

FIG. 5 is a flowchart of another example process 500 for updating a software platform. The process 500 can be implemented by one or more computer programs installed on one or more computers and programmed in accordance with this specification. For example, the process 500 can be performed by the software platform 530 and the platform orchestrator 520 depicted in FIG. 5. For convenience, the process will be described as being performed by a system of one or more computers.

The system executes a workload having an operator software task (step 510). The execution can be performed, e.g., by a software platform launched by a platform orchestrator. The operator software task can perform an upgrade process for the software platform.

The system receives, from the operator software task, a request to upgrade a particular node of the software platform (step 520). The operator software task can send the request through an orchestrator API.

The system upgrades the particular node specified by the request (step 530). Upgrading a platform node can include installing an upgrade to a virtual machine or a container of the software platform.

Suitable software platforms that can use the upgrade processes described in this specification are described in commonly owned U.S. patent application Ser. No. 16/207,689, entitled "ON-DEMAND CLUSTER CREATION AND MANAGEMENT," filed on Dec. 3, 2018; and U.S. patent application Ser. No. 16/226,247, entitled "FRAMEWORK FOR MANAGING CLOUD COMPUTING PLATFORMS," filed on Dec. 19, 2018. The entire contents of both of these applications are herein incorporated by reference.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving, by a platform orchestrator, a request to upgrade computing resources of a software platform launched by the platform orchestrator, wherein a workload having a plurality of different software tasks is executing on a plurality of nodes of the software platform launched by the platform orchestrator;

obtaining, by the platform orchestrator, a workload specification that specifies an upgrade ordering among multiple groups of the plurality of software tasks executing on the software platform; and upgrading, by the platform orchestrator, all platform nodes that execute one or more software tasks in a first group of the multiple groups of software tasks before upgrading platform nodes that execute one or more software tasks in a second group of the multiple groups of software tasks, according to the upgrade ordering specified in the workload specification.

Embodiment 2 is the method of embodiment 1, wherein upgrading a platform node comprises installing an upgrade to a virtual machine or a container of the software platform.

Embodiment 3 is the method of any one of embodiments 1 or 2, wherein the software platform launches the plurality of software tasks according to the groups of software tasks specified in the workload specification such that software tasks in different groups do not execute on a same platform node.

Embodiment 4 is the method of any one of embodiments 1-3, wherein the first group of software tasks comprises one or more master tasks and the second group of software tasks comprises one or more segment tasks, wherein the master tasks issue instructions to the segment tasks.

Embodiment 5 is the method of any one of embodiments 1-4, wherein the workload specification specifies a post-upgrade process to be called by the platform orchestrator for the first group of software tasks, and wherein the operations further comprise executing, by the platform orchestrator, the post-upgrade process after upgrading all platform nodes in the first group and before upgrading any platform nodes in the second group.

Embodiment 6 is the method of embodiment 5, wherein the post-upgrade process performs a workload-specific verification process to verify that the platform nodes executing software tasks in the first group of software tasks were successfully upgraded.

Embodiment 7 is the method of any one of embodiments 1-6, wherein the workload specification specifies a pre-upgrade process to be called by the platform orchestrator for the second group of software tasks, and wherein the operations further comprise executing, by the platform orchestrator, the pre-upgrade process after upgrading all platform nodes in the first group and before upgrading any platform nodes in the second group.

Embodiment 8 is the method of embodiment 7, wherein the pre-upgrade process performs a workload-specific process that provides one or more notifications to software tasks executing in the first group.

Embodiment 9 is a method comprising:
  executing, by a software platform launched by a platform orchestrator, a workload having an operator software task, wherein the operator software task performs an upgrade process for the software platform launched by the platform orchestrator;
  receiving, from the operator software task by the platform orchestrator through an orchestrator application programming interface (API), a request to upgrade a particular node of the software platform; and
  in response, upgrading, by the platform orchestrator, the particular node specified by the request.

Embodiment 10 is the method of embodiment 9, wherein upgrading the particular node comprises installing an upgrade to a virtual machine or a container of the software platform.

Embodiment 11 is the method of any one of embodiments 9 or 10, wherein upgrading the particular node comprises:
  generating upgrade instructions according to the request to upgrade the particular node; and
  sending the upgrade instructions to the particular node.

Embodiment 12 is the method of any one of embodiments 9-11, wherein upgrading the particular node comprises upgrading the particular node without disrupting one or more workloads executing on the particular node.

Embodiment 13 is a distributed computing system comprising a plurality of computers and one or more storage devices storing instructions that are operable, when executed by the plurality of computers, to cause the plurality of computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes described do not necessarily require the particular order shown, or sequential order, to achieve desirable results. In certain implementations, multitasking and parallel processing can be advantageous.

What is claimed is:

1. A distributed computing system comprising a plurality of computers and one or more storage devices storing instructions that are operable, when executed by the plurality of computers, to cause the plurality of computers to perform operations comprising:
  receiving, by a platform orchestrator, a request to upgrade computing resources of a software platform launched by the platform orchestrator, wherein a workload having a plurality of different software tasks is executing on a plurality of nodes of the software platform launched by the platform orchestrator;
  obtaining, by the platform orchestrator, a workload specification that specifies an upgrade ordering among multiple groups of the plurality of software tasks executing on the software platform, wherein the software tasks are grouped according to a topology of the workload defining relationships between software tasks of the plurality of software tasks, and wherein software tasks belonging to different groups do not execute on the same node of the plurality of nodes; and
  upgrading, by the platform orchestrator, all platform nodes that execute one or more software tasks in a first group of the multiple groups of software tasks before upgrading platform nodes that execute one or more software tasks in a second group of the multiple groups of software tasks, according to the upgrade ordering specified in the workload specification.

2. The system of claim 1, wherein upgrading a platform node comprises installing an upgrade to a virtual machine or a container of the software platform.

3. The system of claim 1, wherein the software platform launches the plurality of software tasks according to the groups of software tasks specified in the workload specification.

4. The system of claim 1, wherein the first group of software tasks comprises one or more master tasks and the second group of software tasks comprises one or more segment tasks, wherein the master tasks issue instructions to the segment tasks.

5. The system of claim 1, wherein the workload specification specifies a post-upgrade process to be called by the platform orchestrator for the first group of software tasks, and
wherein the operations further comprise executing, by the platform orchestrator, the post-upgrade process after upgrading all platform nodes in the first group and before upgrading any platform nodes in the second group.

6. The system of claim 5, wherein the post-upgrade process performs a workload-specific verification process to verify that the platform nodes executing software tasks in the first group of software tasks were successfully upgraded.

7. The system of claim 1, wherein the workload specification specifies a pre-upgrade process to be called by the platform orchestrator for the second group of software tasks, and
wherein the operations further comprise executing, by the platform orchestrator, the pre-upgrade process after upgrading all platform nodes in the first group and before upgrading any platform nodes in the second group.

8. The system of claim 7, wherein the pre-upgrade process performs a workload-specific process that provides one or more notifications to software tasks executing in the first group.

9. A distributed computing system comprising a plurality of computers and one or more storage devices storing instructions that are operable, when executed by the plurality of computers, to cause the plurality of computers to perform operations comprising:
deploying a plurality of software tasks of a workload to one or more nodes of a software platform and deploying one or more operator tasks of an operator workload to an operator node of the software platform;
executing, by the software platform launched by a platform orchestrator, the operator workload having an operator software task, wherein the operator software task performs an upgrade process for the software platform launched by the platform orchestrator;
receiving, from the operator software task by the platform orchestrator through an orchestrator application programming interface (API), a request to upgrade a particular node of the software platform, wherein the particular node executes one or more software tasks of the workload; and
in response, upgrading, by the platform orchestrator, the particular node specified by the request.

10. The system of claim 9, wherein upgrading the particular node comprises installing an upgrade to a virtual machine or a container of the software platform.

11. The system of claim 9, wherein upgrading the particular node comprises:
generating upgrade instructions according to the request to upgrade the particular node; and
sending the upgrade instructions to the particular node.

12. The system of claim 9, wherein upgrading the particular node comprises upgrading the particular node without disrupting one or more workloads executing on the particular node.

13. A method comprising:
receiving, by a platform orchestrator, a request to upgrade computing resources of a software platform launched by the platform orchestrator, wherein a workload having a plurality of different software tasks is executing on a plurality of nodes of the software platform launched by the platform orchestrator;
obtaining, by the platform orchestrator, a workload specification that specifies an upgrade ordering among multiple groups of the plurality of software tasks executing on the software platform, wherein the software tasks are grouped according to a topology of the workload defining relationships between software tasks of the plurality of software tasks, and wherein software tasks belonging to different groups do not execute on the same node of the plurality of nodes; and
upgrading, by the platform orchestrator, all platform nodes that execute one or more software tasks in a first group of the multiple groups of software tasks before upgrading platform nodes that execute one or more software tasks in a second group of the multiple groups of software tasks, according to the upgrade ordering specified in the workload specification.

14. The method of claim 13, wherein upgrading a platform node comprises installing an upgrade to a virtual machine or a container of the software platform.

15. The method of claim 13, wherein the software platform launches the plurality of software tasks according to the groups of software tasks specified in the workload specification.

16. The method of claim 13, wherein the first group of software tasks comprises one or more master tasks and the second group of software tasks comprises one or more segment tasks, wherein the master tasks issue instructions to the segment tasks.

17. The method of claim 13, wherein the workload specification specifies a post-upgrade process to be called by the platform orchestrator for the first group of software tasks, and
wherein the operations further comprise executing, by the platform orchestrator, the post-upgrade process after upgrading all platform nodes in the first group and before upgrading any platform nodes in the second group.

18. The method of claim 17, wherein the post-upgrade process performs a workload-specific verification process to verify that the platform nodes executing software tasks in the first group of software tasks were successfully upgraded.

19. The method of claim 13, wherein the workload specification specifies a pre-upgrade process to be called by the platform orchestrator for the second group of software tasks, and
wherein the operations further comprise executing, by the platform orchestrator, the pre-upgrade process after upgrading all platform nodes in the first group and before upgrading any platform nodes in the second group.

20. The method of claim 19, wherein the pre-upgrade process performs a workload-specific process that provides one or more notifications to software tasks executing in the first group.

* * * * *